(12) United States Patent  
Campbell et al.

(10) Patent No.: US 11,999,284 B2  
(45) Date of Patent: Jun. 4, 2024

(54) SOLAR TABLE MOBILE TRANSPORT

(71) Applicant: Terabase Energy, Inc., Berkeley, CA (US)

(72) Inventors: Matthew Campbell, Berkeley, CA (US); Brian Coleman, Portland, OR (US); Tianya Zhao, Pacifica, CA (US); Adam Hansel, Davis, CA (US); Soren Jensen, Corte Madera, CA (US)

(73) Assignee: Terabase Energy, Inc., Berkeley, CA (US)

( * ) Notice: Subject to any disclaimer, the term of this patent is extended or adjusted under 35 U.S.C. 154(b) by 414 days.

(21) Appl. No.: 17/464,178

(22) Filed: Sep. 1, 2021

(65) Prior Publication Data

US 2023/0066547 A1  Mar. 2, 2023

(51) Int. Cl.
  *B60P 3/00* (2006.01)
  *F24S 25/30* (2018.01)
  *F24S 25/65* (2018.01)
  *H02S 99/00* (2014.01)

(52) U.S. Cl.
  CPC ............... *B60P 3/00* (2013.01); *F24S 25/30* (2018.05); *F24S 25/65* (2018.05); *H02S 99/00* (2013.01)

(58) Field of Classification Search
  CPC . B25J 5/007; B25J 9/1615; B60P 3/00; B60P 3/40; G05D 1/0088; G05D 1/0231; H02S 20/30
  See application file for complete search history.

(56) References Cited

U.S. PATENT DOCUMENTS

| | | | |
|---|---|---|---|
| 4,042,004 A | 8/1977 | Kwan | |
| 7,012,188 B2 | 3/2006 | Erling | |
| 7,105,940 B2 | 9/2006 | Weesner et al. | |
| 8,584,338 B2 | 11/2013 | Potter | |
| 8,650,812 B2 | 2/2014 | Cusson | |
| 9,827,678 B1 | 11/2017 | Gilbertson et al. | |
| 10,232,505 B2 * | 3/2019 | Tadayon | F24S 50/20 |
| 11,228,275 B2 * | 1/2022 | Miller | H02S 10/00 |
| 11,241,799 B2 * | 2/2022 | Clemenzi | H02S 20/10 |
| 11,245,353 B2 | 2/2022 | Di Stefano et al. | |
| 11,502,638 B2 | 11/2022 | Watson et al. | |

(Continued)

FOREIGN PATENT DOCUMENTS

| | | |
|---|---|---|
| CN | 103324204 B | 11/2012 |
| CN | 104102227 B | 7/2017 |

(Continued)

OTHER PUBLICATIONS

Restriction requirement dated Jul. 31, 2023 in related U.S. Appl. No. 18/084,987, (7 pgs).

(Continued)

*Primary Examiner* — Jason S Daniels  
(74) *Attorney, Agent, or Firm* — North Weber & Baugh LLP; Michael North

(57) ABSTRACT

A solar table mobile transport is described that moves a solar table to a point of installation. The solar table mobile transport comprises multiple motors that allow movement within a three-dimensional coordinate system as well as provide angular controls of pitch, yaw and roll. These motors enable at least one alignment process used to install the solar table to a mounting structure within a solar system.

18 Claims, 8 Drawing Sheets

(56) References Cited

U.S. PATENT DOCUMENTS

| | | | |
|---|---|---|---|
| 11,770,099 B2* | 9/2023 | Carter | B25J 5/007 |
| | | | 414/495 |
| 2006/0201987 A1 | 9/2006 | Brown | |
| 2008/0260500 A1 | 10/2008 | Meulen | |
| 2010/0000592 A1 | 1/2010 | Ko | |
| 2011/0284709 A1 | 11/2011 | Potter | |
| 2012/0027550 A1 | 2/2012 | Bellacicco et al. | |
| 2012/0085395 A1 | 4/2012 | Kuster et al. | |
| 2012/0279069 A1* | 11/2012 | Von Deylen | F24S 25/16 |
| | | | 29/700 |
| 2013/0153007 A1 | 6/2013 | Plesniak | |
| 2013/0340807 A1 | 12/2013 | Gerwing et al. | |
| 2014/0025343 A1 | 1/2014 | Gregg et al. | |
| 2014/0143061 A1 | 5/2014 | Abyanker | |
| 2014/0246549 A1 | 9/2014 | West et al. | |
| 2015/0066442 A1 | 3/2015 | Pryor | |
| 2015/0069001 A1 | 3/2015 | French et al. | |
| 2016/0014283 A1 | 1/2016 | Nakano et al. | |
| 2016/0129595 A1 | 5/2016 | Gerio et al. | |
| 2016/0285412 A1 | 9/2016 | French | |
| 2019/0280641 A1 | 9/2019 | Owen | |
| 2019/0341878 A1 | 11/2019 | Watson et al. | |
| 2019/0367014 A1 | 12/2019 | Woodley | |
| 2020/0076358 A1 | 3/2020 | Au | |
| 2021/0041145 A1 | 2/2021 | Dally | |
| 2021/0205997 A1* | 7/2021 | Zhou | H02S 10/00 |
| 2021/0206003 A1* | 7/2021 | Zhou | G05D 1/0088 |
| 2021/0234504 A1 | 7/2021 | Meller et al. | |
| 2021/0293455 A1 | 9/2021 | Au | |
| 2021/0379757 A1* | 12/2021 | Schneider | B25J 5/007 |
| 2022/0034426 A1 | 2/2022 | Clapper et al. | |
| 2022/0234516 A1 | 7/2022 | Prentice et al. | |
| 2023/0163720 A1 | 5/2023 | Di Stefano et al. | |

FOREIGN PATENT DOCUMENTS

| | | |
|---|---|---|
| CN | 209707983 U | 11/2019 |
| CN | 219535977 U | 8/2023 |
| GB | 734098 | 7/1955 |
| KR | 101019430 B1 | 9/2008 |
| KR | 20110031053 A | 9/2009 |
| WO | 2011117485 A1 | 9/2011 |
| WO | 2013064624 A1 | 5/2013 |
| WO | WO 2015190901 A1 | 12/2015 |
| WO | WO 2018138033 A1 | 8/2018 |
| WO | WO 2021119733 A1 | 6/2021 |
| WO | 2021229387 A2 | 11/2021 |
| WO | WO 2022112921 A1 | 6/2022 |
| WO | WO 2023079377 A1 | 5/2023 |

OTHER PUBLICATIONS

Response to restriction requirement filed Sep. 28, 2023 in related U.S. Appl. No. 18/084,987, (8 pgs).
Restriction requirement dated Sep. 22, 2023 in related U.S. Appl. No. 17/390,159, (7 pgs).
International search report and written opinion of the international searching authority dated Dec. 16, 2022 in related PCT application No. PCT/US22/38288, (11 pgs).
International Search Report and Written Opinion of the International Searching Authority dated May 1, 2023 in related PCT application No. PCT/US23/11125, (9 pgs).
International Search Report and Written Opinion of the International Searching Authority dated Dec. 13, 2022 in related PCT application No. PCT/US22/42396, (9 pgs).
International search report and written opinion of the international searching authority dated Nov. 20, 2023 in related PCT application No. PCT/US2023/029584, (7 pgs).
Response to Restriction requirement filed Nov. 21, 2023 in related U.S. Appl. No. 17/390,159, (7 pgs).
Notice of allowance dated Nov. 14, 2023 in related U.S. Appl. No. 18/084,987, (21 pgs).
International search report and written opinion of the international searching authority dated Dec. 21, 2023 in related PCT application No. PCT/US2023/029583, (14 pgs).
Non-final office action dated Jan. 18, 2024 in related U.S. Appl. No. 17/390,159, (33 pgs).

* cited by examiner

SOLAR TABLE MOBILE TRANSPORT

STATEMENT REGARDING FEDERALLY SPONSORED RESEARCH OR DEVELOPMENT

This invention was made with government support under DE-EE0009012 awarded by the U.S. Department of Energy. The government has certain rights in the invention.

TECHNICAL FIELD

The present disclosure relates generally to a motorized solar table transport used in the construction of large-scale solar systems. More particularly, the present disclosure relates to a motorized solar table transport that moves a solar table from a solar table assembly factory to an installation point and provides alignment capabilities across a three-dimensional coordinate system and angular controls of pitch, yaw and roll.

BACKGROUND

The importance of solar power systems is well understood by one of skill in the art. Government agencies and companies are scaling the size and number of solar solutions within their energy infrastructure. This transition from traditional fossil fuel energy systems to solar energy solutions presents several challenges. One challenge is cost-effective management of the construction process and the ability to efficiently move components around the site during the construction process.

Large-scale solar panel systems typically include thousands of solar panels that are located across a multi-acre terrain and that are electrically coupled to provide a source of energy. These large-scale systems are oftentimes located in remote areas and require a significant investment in materials, resources and labor in their installation and design. The sourcing and delivery of materials and resources for these installations can be problematic and inconsistent. A further complication is the reliable and safe movement of these materials and resources across large areas of the construction site as well as maintaining consistent installation processes at each point of installation within the site. These issues further contribute to an increase in the cost and complexity of what is already a very cost-sensitive process.

FIG. 1 illustrates a typical prior-art installation process for solar systems. This prior-art installation process is implemented such that all mounting equipment for each solar panel is individually assembled and installed at its location within the larger system. The cost-effectiveness of this approach works fine within smaller solar deployments but struggles to cost-effectively scale to large solar systems as described below.

This traditional deployment 101 relies on materials being delivered to a deployment site via an access road. The materials are then processed and staged at the deployment site by a crew. A small portion of this delivered material is then moved by heavy equipment to a specific location where a solar panel and mounting equipment are assembled and installed at that location 102. The step is then repeated for an adjacent location 103 where materials are subsequently delivered, assembled and installed for a neighboring solar table within the system. While this approach may be effectively deployed in the installation of smaller solar systems, it becomes cost-prohibitive as the size of the system increases.

What is needed are systems, devices and methods that reduce the complexity and cost of the installation of large-scale solar panel systems.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that the description is not intended to limit the scope of the invention to these particular embodiments. Items in the figures may be not to scale.

FIGURE ("FIG.") 1 shows a prior art assembly and installation process of large-scale solar panel systems.

DETAILED DESCRIPTION OF EMBODIMENTS

Figure 1:
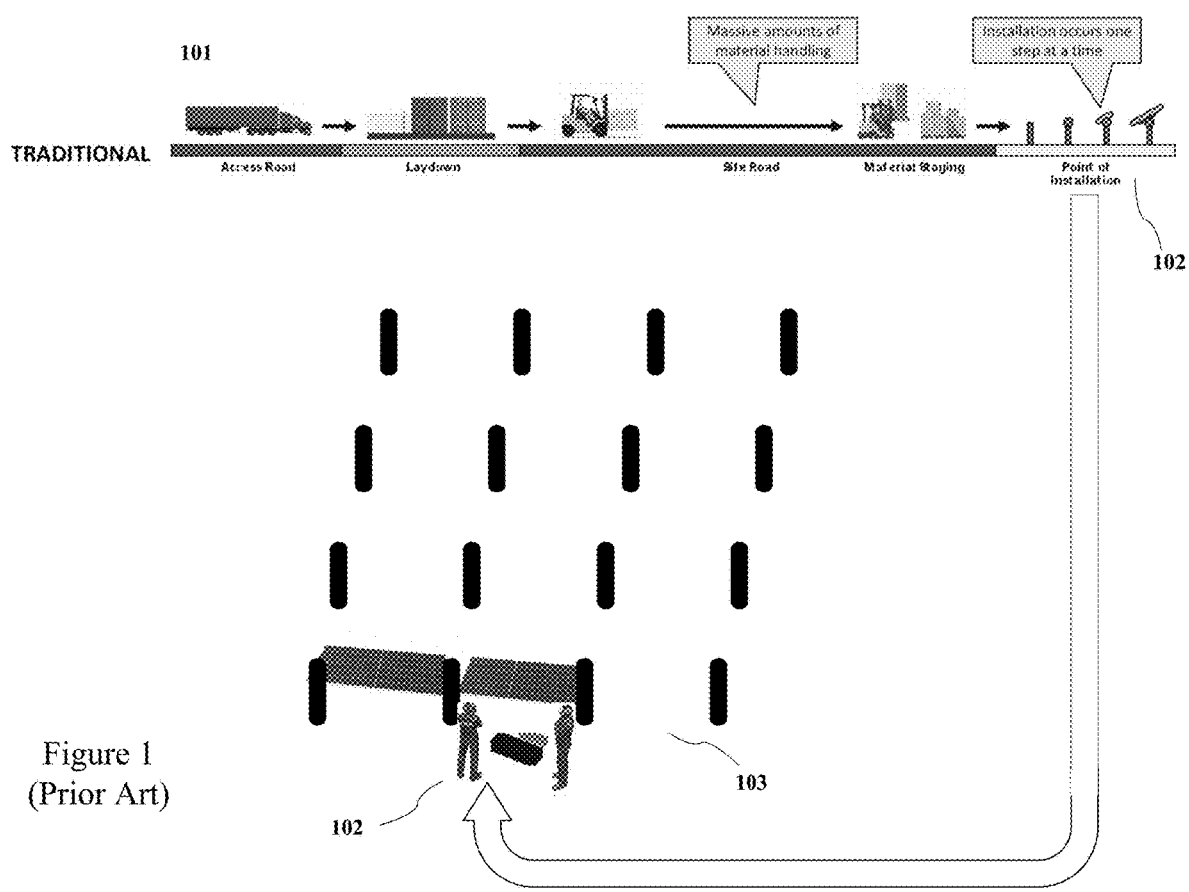

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in a variety of mechanical structures supporting corresponding functionalities of the solar table mobile transport.

Furthermore, connectivity between components or systems within the figures are not intended to be limited to direct connections. Rather, data between these components may be modified, re-formatted, or otherwise changed by intermediary components. Also, components may be integrated together or be discrete prior to construction of a solar panel mobile transport.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A component, function, or structure is not limited to a single component, function, or structure; usage of these terms may refer to a grouping of related components, functions, or structures, which may be integrated and/or discrete.

Further, it shall be noted that: (1) certain components or functionals may be optional; (2) components or functions may not be limited to the specific description set forth herein; (3) certain components or functions may be assembled/combined differently across different solar table mobile transports; and (4) certain functions may be performed concurrently or in sequence.

Furthermore, it shall be noted that many embodiments described herein are given in the context of the assembly and installation of large numbers of solar tables within a system, but one skilled in the art shall recognize that the teachings of the present disclosure may apply to other large and complex construction sites in which resources and personnel are difficult to manage and accurately predict. Additionally, embodiments of a solar table mobile transport may be implemented in smaller construction sites.

In this document, "large-scale solar system" refers to a solar system having 1000 or more solar panels. The word "resources" refers to material, parts, components, equipment or any other items used to construct a solar table and/or solar system. The word "personnel" refers to any laborer, worker, designer or individual employed to construct or install a solar table or solar system. The term "solar table" refers to a structural assembly comprising a torque tube and/or purlins with module rails. Some types of solar tables may have supplemental structure that allows it to connect to foundations/piles while other types do not have this supplemental structure. A solar table may have (but is not required) solar panels and/or electrical harnesses. The term "solar table mobile transport" (hereinafter, "mobile transport") describes a vehicle used to move a solar table to an installation site and facilitate an installation process of the solar table. A mobile transport may be driven by personnel, controlled by remote control or move autonomously within at least a portion of a solar system construction site. The term "motor" is defined as a structural device that produces motion of a solar table, this motion may be unidirectional or multidirectional. Examples of some motors may include elements such as actuators, tracks, etc. that help in producing motion of the solar table.

Figure 2:
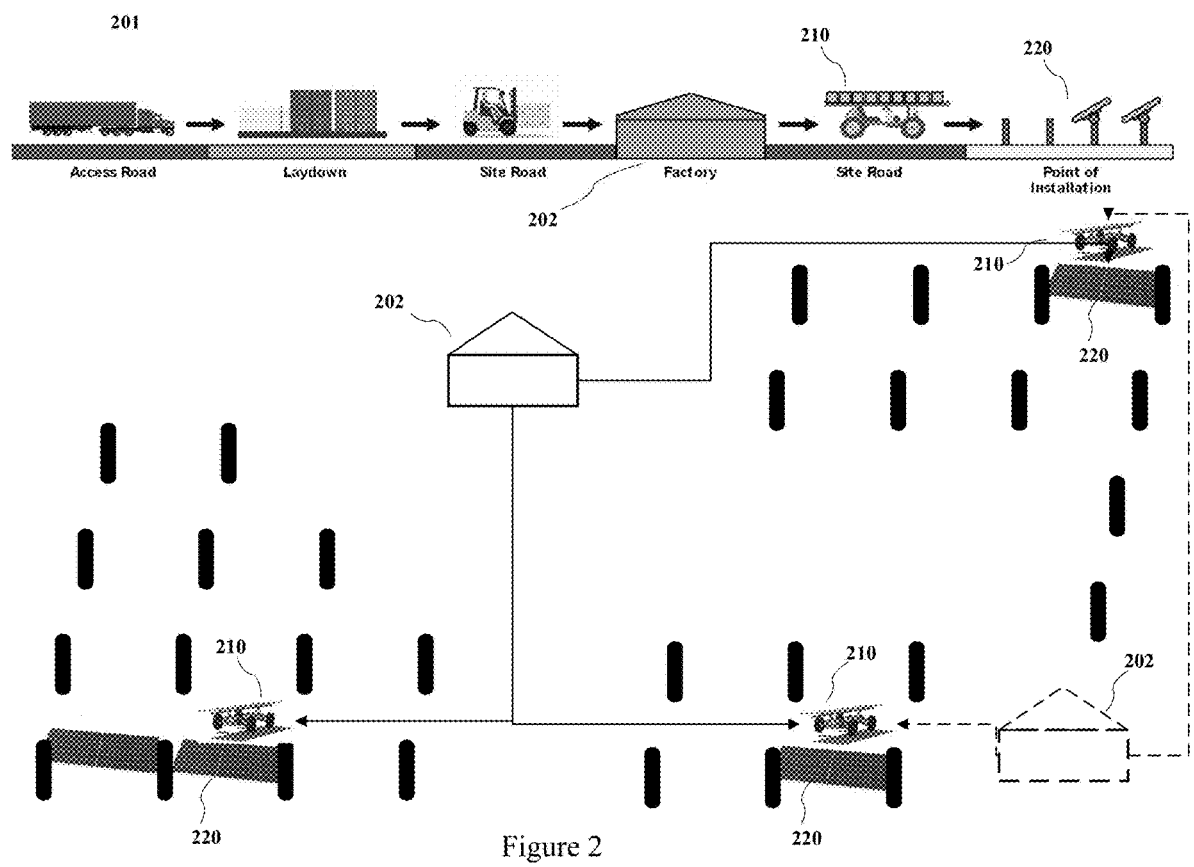
FIG. 2 is a diagram showing a centralized assembly and installation of a solar system including mobile transport of solar tables in accordance with various embodiments of the invention.

FIG. 2 provides an overview of a centralized solar table assembly and installation for large-scale solar systems according to various embodiments of the invention. Embodiments of the invention transition the prior art approach of assembly and installation at single location sites to a centralized and coordinated assembly factory that allows a more cost-effective and dynamic process of constructing large-scale solar systems. This centralized assembly of solar system components, such as solar tables, necessitates a more robust transport vehicle to move the pre-assembled components to the installation site. Additionally, the installation of these pre-assembled components may require functionality to support the alignment and integration of these components into the system.

Resources are brought to a construction site 201 for a large-scale solar systems and initially processed. These resources are delivered to one or more assembly factories 202 where a coordinated and centralized solar table assembly process is performed. In certain embodiments, a construction site may have multiple centralized factories 202. As shown in FIG. 2, there are two centralized factories 202 strategically located at the site. The location and number of centralized factories 202 may depend on several parameters including the size of the site, the terrain of the site, the design of the site and other variables that relate to the construction of the large-scale solar system.

Assembled solar tables and equipment are moved from a factory 202 to a point of installation 220 via motorized vehicles 210 such as a mobile transport. In certain embodiments, the mobile transports are specifically designed to transport solar tables along a site road to the point of installation 220. As previously mentioned, the mobile transports 210 may be driven by personnel, may be controlled by remote control or autonomously driven by a computer system. The time and/or sequence in which solar tables are delivered to points of installation 220 may depend on a variety of factors that may be analyzed to configure a preferred schedule.

Figure 3:
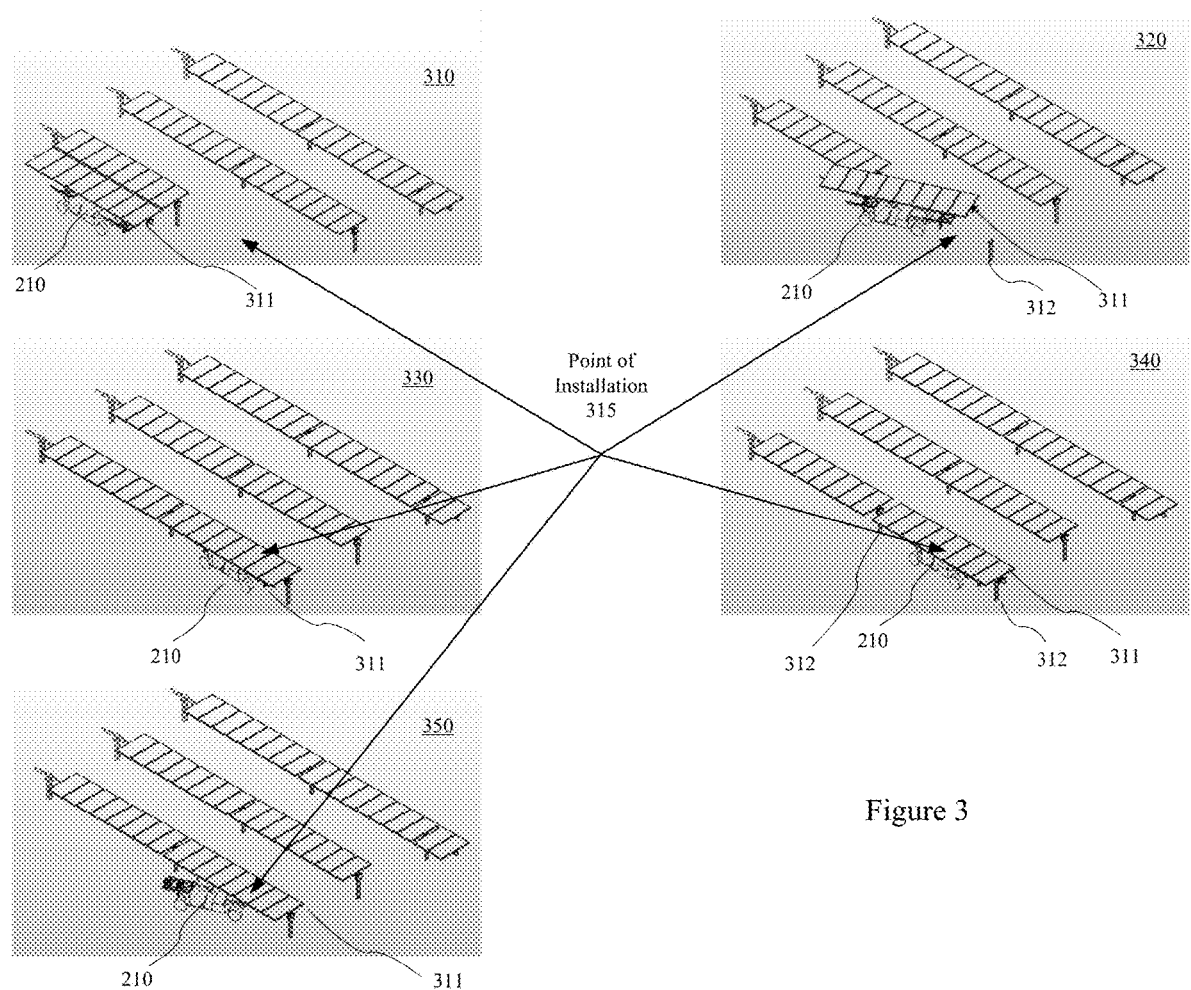
FIG. 3 is an exemplary sequence of diagrams illustrating an installation of a solar table within a solar system using a mobile transport according to various embodiments of the invention.

FIG. 3 illustrates a sequence of installation steps of a solar table at an installation site using a solar panel mobile transport according to various embodiments of the invention. As shown in 310, a mobile transport 210 supporting a solar table 311 approaches a point of installation 315. The solar table 311 is secured to the mobile transport 210 by a solar table attachment component that securely holds the solar table above the mobile transport 210. In certain embodiments, the solar table 311 is assembled and secured to the attachment component at a centralized assembly factory and subsequently driven to the point of installation 315.

As shown in 320, the mobile transport 210 approaches the point of installation 315 in preparation for installation within the solar system. The point of installation 315 comprises structures used to secure the solar table 312 within the system. For example, a solar table 312 may be secured to a previously installed table whereby a torque tube in the solar table 312 is inserted into a previously installed table. The previously installed table may be secured to a pile 312 where threaded fasteners/rivets connect its bearing housing assembly/brackets to the pile 312. As shown in 330, the mobile transport 210 aligns the solar table 311 at the installation point 315 for subsequent integration into solar system. This alignment process will be discussed in more detail below and includes alignment along a three-dimensional coordinate system as well as angular control of yaw, pitch and roll.

As shown in 340, the solar table is secured within the solar system after alignment is completed. This securitization process includes attached the solar table 210 to piles 312 that lock the solar table in line with adjacent solar tables. One skilled in the art will recognize that other processes may be employed to securely lock a solar table 311 within the system and may use other components that replace or supplement the piles 312.

As shown in 350, the mobile transport 210 detaches from the solar table 311. The attachment component lowers after the solar table 311 is secured within the system so that the mobile transport 210 may leave the point of installation 315.

Figure 4:
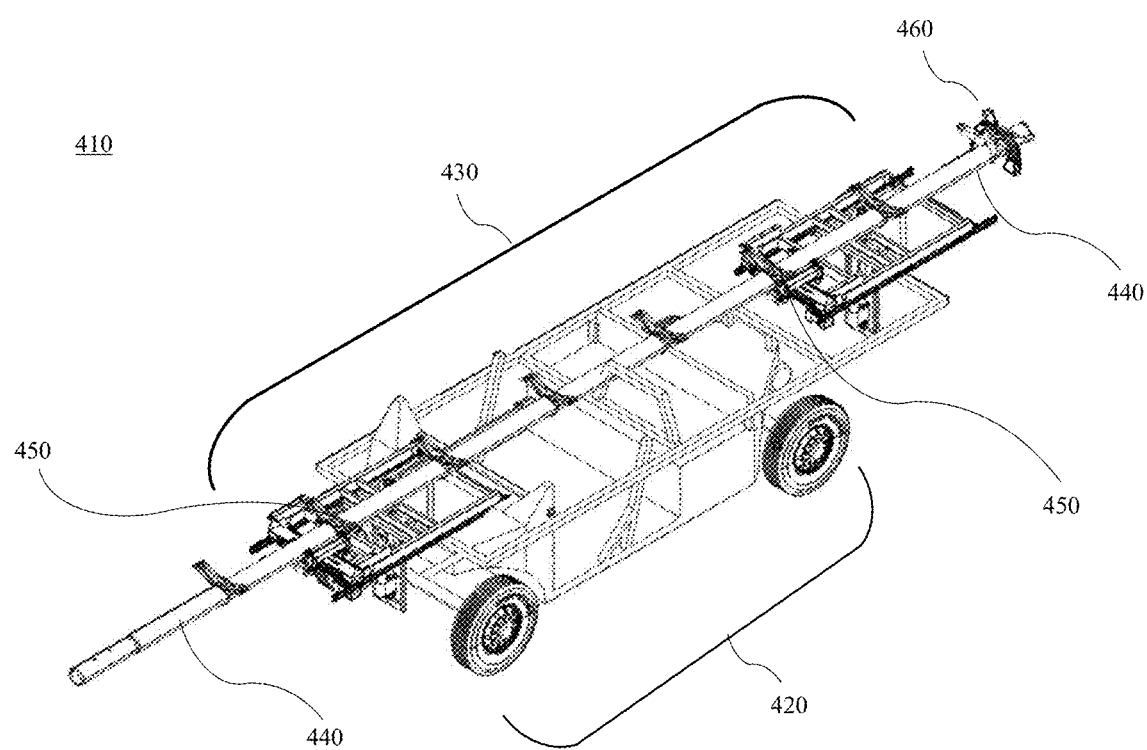
FIG. 4 is an overhead view of a solar table mobile transport according to various embodiments of the invention.

FIG. 4 illustrates a mobile transport in accordance with various embodiments of the invention. This mobile transport 410 comprises an attachment component 430 and a transport component 420 that support a robust vehicle that can securely move solar tables to an installation point and support alignment and integration of the table into the solar system. In this example, the attachment component 430 is coupled to a torque tube 440.

The transport component 420 comprises a vehicular segment that can move throughout a solar system construction site under the control of a driving system. As previously discussed, the transport component may be controlled by an in-vehicle driver, a remote control being used by personnel or an autonomous driving system. If an autonomous driving system is employed, the transport component 420 comprises autonomous driving capabilities which include both a vehicle location element (such as a GPS location, autonomous sensor and image processing, and/or virtual construction site map including roads between factories and installation sites). The transport component 420 also comprises a vehicular segment such as a wheel system, tractor system and/or robotic movement system that moves a solar table from a factory to an installation point. One skilled in the art will recognize that the transport component 420 may be modified and/or supplemented with a variety of structural and functional elements to further assist in the transportation of solar tables within a solar system construction site.

The attachment component 430 may be located above and coupled to the transport component 420. The attachment component 430 may also be an extension to transport component 420 at a variety of angles and across one or more portions of the attachment 430. The attachment component 430 comprises a plurality of attaching elements that securely attach to a solar table. In one example, the attaching elements are end effectors 450 that securely hold a torque tube 440 to allow movement and alignment processes. The attachment component 430 also includes independent motors that position and align a solar table within a three-dimensional space as well as control angular movement to facilitate proper integration into a system. As will be described in more detail below, these motors can provide alignment of heavy structures, such as solar tables, using personnel controlling the motors or autonomous control where alignment movement is driven by sensors.

The end effectors 450 may be positioned anywhere on the attachment component 430 to securely hold a variety of different shapes and types of solar tables. In one embodiment, the end effectors 450 are positioned along an axis to allow secure attachment to a torque tube 440 of a solar table. This torque tube 440 may have other components, such as solar panels, attached to it.

One skilled in the art will recognize that the attachment component 430 may be modified and/or supplemented with a variety of structural and function elements to further assist in the attachment process to a solar table or the alignment/installation process of the solar table within the solar system.

Figure 5:
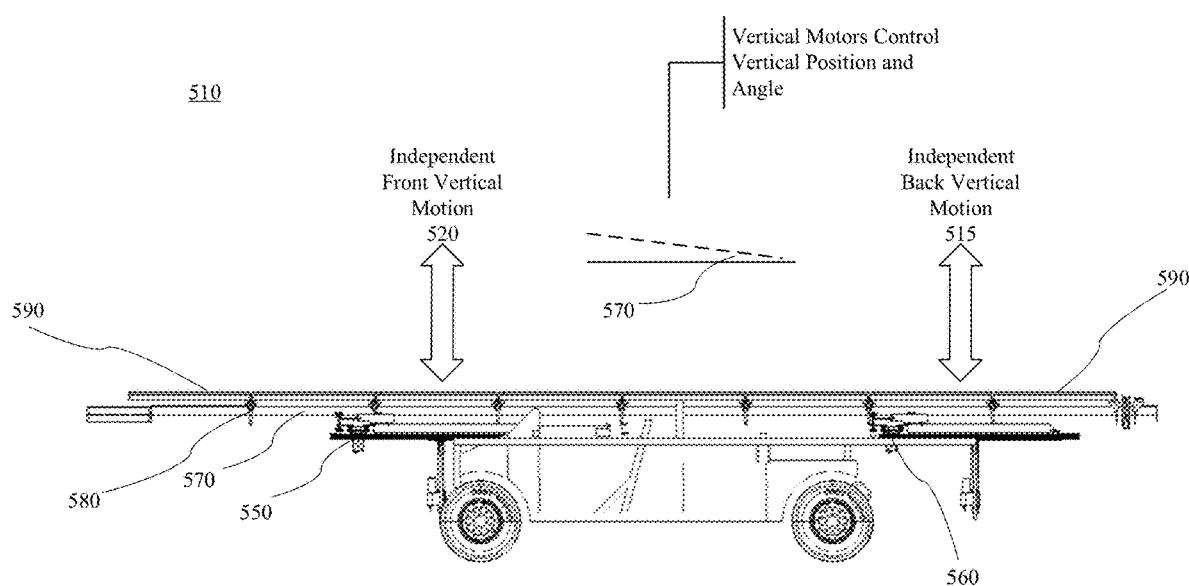
FIG. 5 is a side-view of a solar table mobile transport in a lower position in accordance with various embodiments of the present invention.

FIG. 5 illustrates a side-view of a mobile transport with an attachment component in a lowered position in accordance with various embodiments of the invention. This figure shows a first motor 550 near the front section of the mobile transport 510 and a second motor 560 near the back end of the mobile transport 510. In certain embodiments of the invention, each of these motors provides independent vertical motion for raising and lowering an attached solar table. In particular, the first motor 550 provides independent first vertical motion 520 and the second motor 560 provides second vertical motion 515 of the solar table as well as providing pitch angle 570 of the solar table. This vertical motion and pitch control is a component in alignment processes supported by the mobile transport 510.

In this embodiment, an attachment component of the mobile transport 510 includes end effectors 580 that couple the attachment component to a torque tube 570 of the solar table. Additionally, the solar table comprises at least one solar panel 590.

One skilled in the art will recognize that various types of motors may be deployed within the mobile transport 510 to provide vertical motion and pitch control. In certain embodiments, pitch control is realized by having a variation of lift applied to the solar table between the first motor 550 and the second motor 560. The motors used to generate vertical lift and control pitch of the solar table may have a variety of structures and functions according to the requirements of the installation processes, an example of which is illustrated in FIG. 6.

Figure 6:
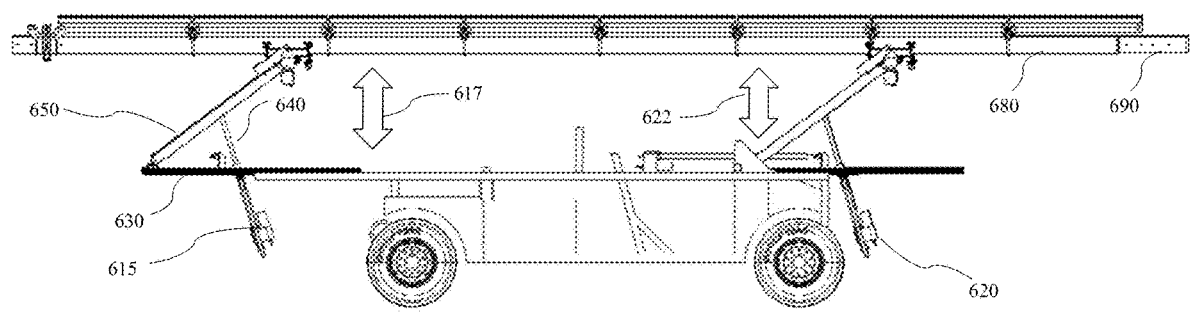
FIG. 6 is a side-view of a solar table mobile transport in a raised position in accordance with various embodiments of the present invention.

FIG. 6 illustrates a side-view of a mobile transport with an attachment component in a raised position in accordance with various embodiments of the invention. In this example, the first motor 620 provides a lift magnitude 622 and the second motor 615 provides a lift magnitude 617 that are equal resulting in zero pitch. If however, these two lift magnitudes were different then a corresponding pitch angle is generated across the solar table.

FIG. 6 also illustrates an exemplary motor system for providing vertical lift that includes a motor 615, a horizontal support 630, a vertical support 650 and an actuator arm 640. The motor 615 extends or retracts the upper end of the actuator arm 640 that results in a vertical movement of the vertical support 650. This independent motorized movement on both motors 615, 620 allows robust vertical and pitch control of the solar table relative to a method of installation at an installation point.

In one example, the solar table is installed within a system by inserting an end of a torque tube of a solar table into an opening of mounting rail or another torque tube. As shown, the torque tube 680 comprises a swaged end 690 that has a smaller circumference than the center of the torque tube. This swaged end 690 is inserted into the opening to secure it to a mounting rail, neighboring solar table, or other structure within the system. The swaged end 690 may also have drilled holes that provide locking fasteners to be inserted that further secure the torque tube 680 to the structure to which it is coupled.

One skilled in the art will recognize that proper alignment of the swaged end 690 to an opening within bearing housing assembly 460 or adjacent structure will also require horizontal and angular yaw control of the solar table as well as rotational control to align drilled holes in the swaged end 690 and mounting structure.

Figure 7:
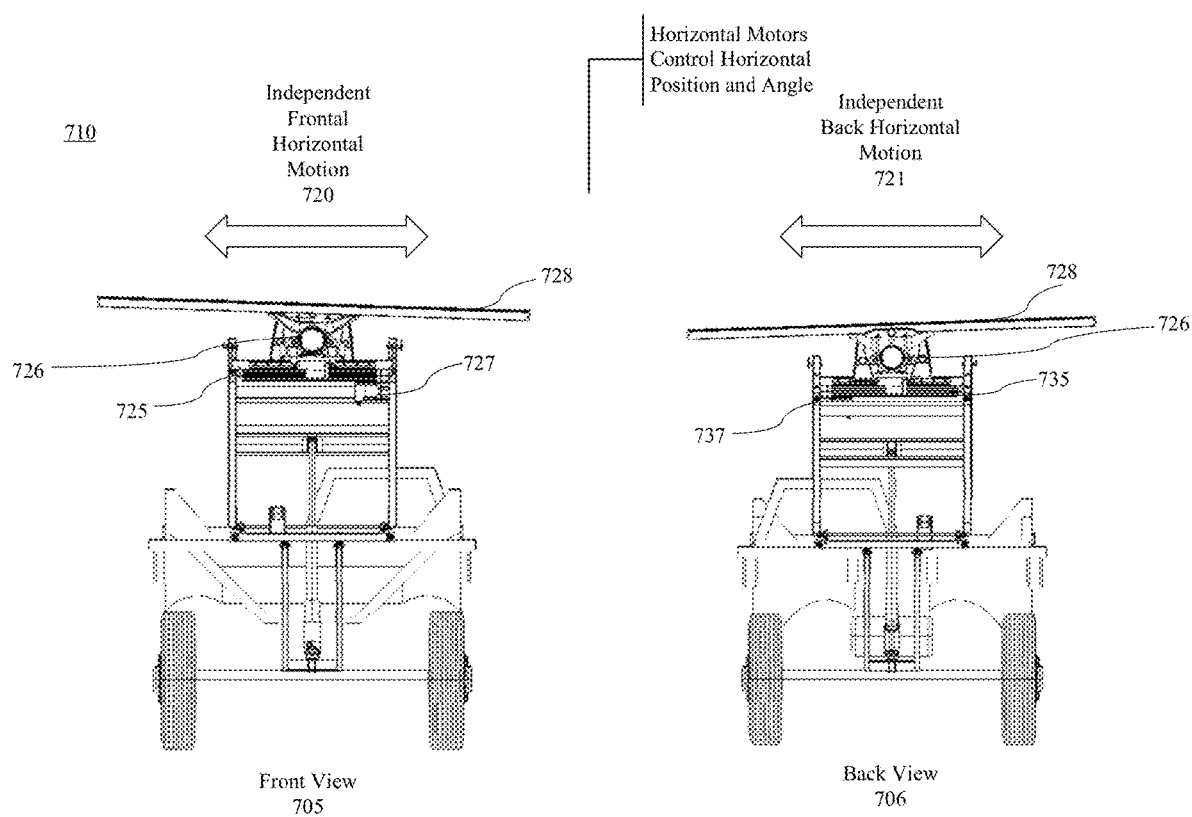
FIG. 7 is a front view and a back view of a solar table mobile transport according to various embodiments of the invention.

FIG. 7 illustrates a mobile transport 710 that comprises two independent motors that provide horizontal movement and yaw control of a solar table according to various embodiments of the invention. In this Figure, a front view 705 and a back view 706 illustrate the front view showing a first horizontal motor 727 and a back view showing a second horizontal motor 737.

The first horizontal motor 727 provides independent horizontal control 720 of a front portion of a solar table having a torque tube 726 and at least one solar panel 728. In this example, the first horizontal motor 727 causes a first set of horizontal tracks 725 to move the front portion of the solar table along a horizontal plane. The horizontal tracks include an upper track and a lower track that move the solar table accordingly. A second horizontal motor 737 cases a second set of horizontal tracks 735 to move the back portion of the solar table along the horizontal plane. The independent horizontal movement 720, 721 allows a robust horizontal movement of the solar table as well as yaw angular control. In certain embodiments, this horizontal movement and yaw angular control enhances alignment processes supported by the mobile transport including the insertion of a swaged end 690 of the torque tube 726 into an opening of an adjacent table torque tubeor other structure.

Figure 8:
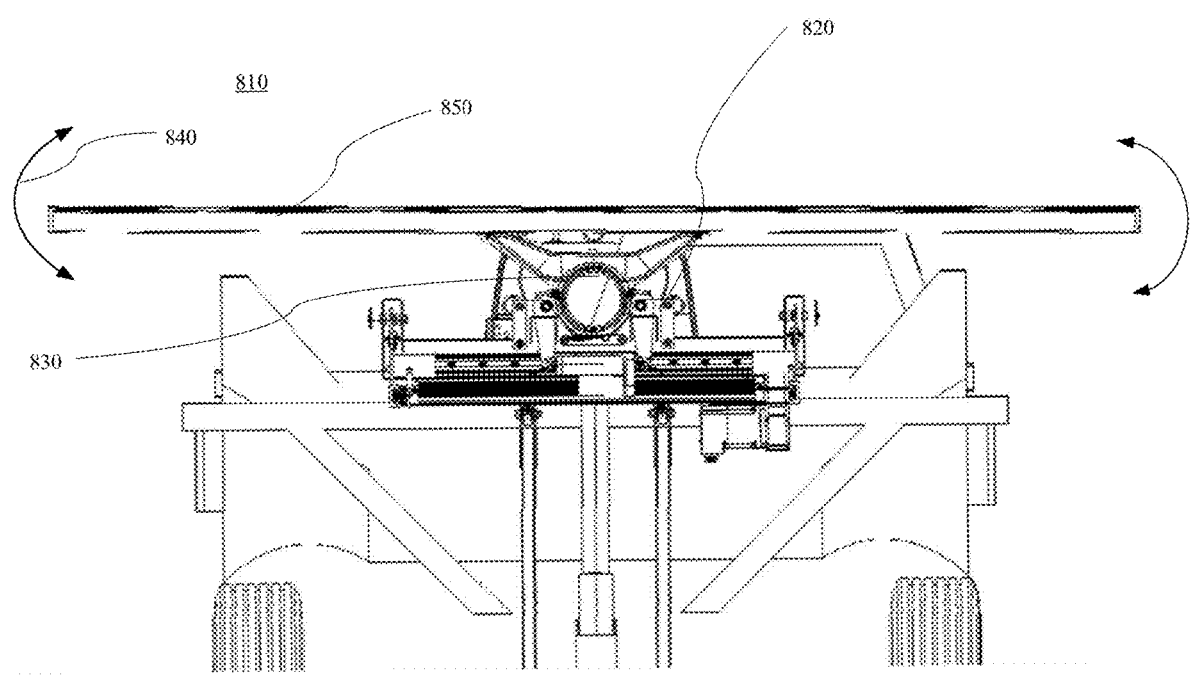
FIG. 8 is a focused front view of a solar table mobile transport illustrating rotational functionalities according to various embodiments of the invention.

One skilled in the art will recognize that various types of motors may be deployed within the mobile transport 710 to provide horizontal motion and yaw control. In certain embodiments, yaw control is realized by having a variation of horizontal movement applied to the solar table between the first motor 727 and the second motor 737. The motors used to generate horizontal lift and control yaw of the solar table may have a variety of structures and functions according to the requirements of the installation processes, Embodiments of the invention also include a mobile transport having a rotating actuator that rotates a solar table. As shown in FIG. 8, a mobile transport 810 is provided with a rotational actuator 820 that rotates a solar table around an axis. In this example, a solar table having a torque tube 830 and at least one solar panel 850 can be rotated around a center point of the torque tube 830. This rotational movement allows further functionality in the alignment process.

In one embodiment, the rotational movement allows a swaged end 690 having multiple drill holes to be rotated within an opening of a pile or other structure. This rotational movement allows the drill holes within the swaged end 690 to be aligned to corresponding holes in the mounting structure. Thereafter, threaded fasteners or rivets may be placed within the set of drill holes to secure the swaged end 690 in opening structure.

One skilled in the art will recognize that a solar table may have a variety of different support structures such as beams, purlins, etc., that either supplement or replace a torque tube. All of these different solar type examples are intended to fall within the scope of certain embodiments of the invention.

One skilled in the art will recognize that the different movements supported by the mobile transport support robust alignment processes that allow for a more efficient and accurate alignment of a solar table to a corresponding mounting structure. In some embodiments, the alignment process(es) may be performed manually by personnel at the installation site that control each of the motors during alignment. In other embodiments, the alignment process(es) may be automatically performed by sensors and motor controls such that motor movement is controlled by computerized analysis of sensor data and/or image data. A variety of sensor technologies may be employed by a mobile transport such as LiDAR, camera sensors, radar sensors and other sensor technologies known to one of skill in the art. Furthermore, active and passive sensor systems may also be deployed.

In certain examples, detachable sensor systems may be positioned on a solar table (such as on a torque tube) prior to or during installation of the solar table. The detachable sensor device/system may be removed from the solar table once installation is complete and positioned on another table that needs to be installed within the system.

In other examples, the alignment process may comprise both manual and automated processes that result in the installation of a solar panel within the system.

The mobile transport may also include verification devices that confirm a solar table has been properly installed. These verification devices may include sensors that measure movement under a test force of the solar table to determine whether a swaged end 690 is tightly inserted within a corresponding mounting structure.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A solar table mobile transport (hereinafter, "mobile transport") for moving a solar table, the mobile transport comprising:
  a transport component having a vehicular segment and a driving system, the transport component being operable to move the solar table from a first location to a point of installation under control of the driving system;
  an attachment component coupled to the transport component, the attachment component comprising at least one attaching element that securely attaches to the solar table and a plurality of motors that support at least one alignment process implemented during an installation of the solar table to at least one mounting structure; and
  wherein the at least one attaching element comprises a plurality of end effectors that couple to at least one of a torque tube, a purlin and/or a beam within the solar table.

2. The mobile transport of claim 1 wherein the driving system comprises a steering mechanism that allows personnel to drive the mobile transport to the point of installation.

3. The mobile transport of claim 1 wherein the driving system comprises a remote-controlled steering mechanism through which personnel remotely drive the mobile transport to the point of installation.

4. The mobile transport of claim 1 wherein the driving system comprises automated controls that provides automated steering to drive the mobile transport to the point of installation.

5. The mobile transport of claim 4 wherein the automated controls comprises location detection and a virtual map of a solar system construction site, the location detection identifies a location of the mobile transport within the virtual map and identifies a path to the point of installation.

6. The mobile transport of claim 1 further comprising:
  a first motor coupled within a front portion of the attachment component, the first motor providing first vertical movement of a front portion of the solar table;
  a second motor coupled within a back portion of the attachment component, the second motor providing a second vertical movement of a back portion of the solar table; and
  wherein a combination of the first and second vertical movements create a pitch angle of the solar table.

7. The mobile transport of claim 6 wherein the first motor uses a first actuator to vertically move the from portion of the solar table and the second motor uses a second actuator to vertically move the back portion of the solar table.

8. The mobile transport of claim 1 further comprising:
a first motor coupled within a front portion of the attachment component, the first motor providing first horizontal movement of a front portion of the solar table;
a second motor coupled within a back portion of the attachment component, the second motor providing a second horizontal movement of a back portion of the solar table; and
wherein a combination of the first and second vertical movements create a yaw angle of the solar table.

9. The mobile transport of claim 8 wherein the first motor uses a first set of tracks to move the front portion of the solar table and the second motor uses a second set of tracks to move the back portion of the solar table.

10. The mobile transport of claim 1 further comprising a rotational motor that rotates a solar table around an axis.

11. The mobile transport of claim 10 wherein the axis is parallel to the torque tube.

12. The mobile transport of claim 10 wherein the rotation motor aligns a first plurality of drill holes within a swaged end of a torque tube to a second plurality of drill holes in a mounting structure.

13. The mobile transport of claim 12 wherein the mounting structure is a pile.

14. The mobile transport of claim 1 wherein the at least one alignment process is at least partially automated using a plurality of sensors.

15. The mobile transport of claim 14 wherein the plurality of sensors comprises at least one of a Lidar sensor, a camera sensor and/or radar sensor.

16. The mobile transport of claim 1 further comprising a verification element that verifies the installation is complete.

17. A solar table mobile transport (hereinafter, "mobile transport") for moving a solar table, the mobile transport comprising:
a transport component having a movement system and a driving system, the transport component being operable to move the solar table from a first location to a point of installation under control of the driving system; and
an attachment component coupled to the transport component, the attachment component comprising at least one attaching element that securely attaches to the solar table and a plurality of motors comprising:
a first motor coupled within a front portion of the attachment component, the first motor providing first vertical movement of a front portion of the solar table;
a second motor coupled within a back portion of the attachment component, the second motor providing a second vertical movement of a back portion of the solar table;
a third motor coupled within the front portion of the attachment component, the third motor providing first horizontal movement of the front portion of the solar table;
a fourth motor coupled within the back portion of the attachment component, the fourth motor providing a second horizontal movement of the back portion of the solar table; and
a fifth motor coupled within the attachment component, the fifth motor rotates the solar table around an axis point.

18. The mobile transport of claim 17 wherein at least one of the first, second, third, fourth and/or fifth motors is autonomously controlled.

* * * * *